US012459782B2

(12) United States Patent
Geer et al.

(10) Patent No.: US 12,459,782 B2
(45) Date of Patent: Nov. 4, 2025

(54) RECEIVER-LESS DEVICE POSITIONING

(71) Applicant: Otis Elevator Company, Farmington, CT (US)

(72) Inventors: Kayla Geer, Newington, CT (US); Sam T. Wong, Bridgeport, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1645 days.

(21) Appl. No.: 16/809,643

(22) Filed: Mar. 5, 2020

(65) Prior Publication Data

US 2021/0276826 A1 Sep. 9, 2021

(51) Int. Cl.
*B66B 1/46* (2006.01)
*B66B 1/34* (2006.01)

(52) U.S. Cl.
CPC ............ *B66B 1/468* (2013.01); *B66B 1/3453* (2013.01); *B66B 1/3461* (2013.01); *B66B 2201/232* (2013.01); *B66B 2201/4615* (2013.01); *B66B 2201/4638* (2013.01); *B66B 2201/4653* (2013.01); *B66B 2201/4684* (2013.01)

(58) Field of Classification Search
CPC ............... B66B 1/468; B66B 2201/211; B66B 2201/4615; B66B 2201/4653; B66B 2201/102; B66B 2201/103; B66B 1/3461; B66B 2201/403; B66B 1/3415; B66B 2201/4638; B66B 2201/402; B66B 2201/232; B66B 2201/212; B66B 1/3453; B66B 2201/4684
USPC .......................................................... 187/381
See application file for complete search history.

(56) References Cited

U.S. PATENT DOCUMENTS

| | | | | |
|---|---|---|---|---|
| 5,981,051 | A | 11/1999 | Motegi et al. | |
| 10,640,329 | B2 * | 5/2020 | Simcik | H04W 4/023 |
| 2017/0174469 | A1 * | 6/2017 | Chapman | B66B 9/00 |
| 2018/0118509 | A1 | 5/2018 | Simcik et al. | |
| 2018/0118511 | A1 | 5/2018 | Baldi et al. | |
| 2018/0167580 | A1 | 6/2018 | Hasegawa | |
| 2018/0346282 | A1 * | 12/2018 | Simcik | H04W 4/023 |

(Continued)

FOREIGN PATENT DOCUMENTS

| | | | |
|---|---|---|---|
| CN | 1976855 | A | 6/2007 |
| CN | 105764827 | A | 7/2016 |

(Continued)

OTHER PUBLICATIONS

Extended European Search Report issued Jun. 9, 2021 for Application No. 20215606.3

(Continued)

*Primary Examiner* — Christina M Schreiber
(74) *Attorney, Agent, or Firm* — CANTOR COLBURN LLP

(57) ABSTRACT

Provided are embodiments of a method for operating a receiverless device positioning. The method includes receiving a first request corresponding to a first location, registering data associated with the first request, and receiving a second request at a second location, the first location is different than the second location. The method also includes comparing the first and second location, and time between the first request and the second request, and allowing the second request based at least in part on the comparison. Also provided are embodiments of a system configured to perform receiverless positioning.

20 Claims, 5 Drawing Sheets

400

(56) References Cited

U.S. PATENT DOCUMENTS

| | | | | |
|---|---|---|---|---|
| 2018/0370758 | A1* | 12/2018 | Huang | B66B 1/2408 |
| 2019/0135580 | A1* | 5/2019 | Scoville | B66B 1/468 |
| 2020/0130997 | A1* | 4/2020 | Simcik | B66B 3/00 |
| 2020/0307951 | A1* | 10/2020 | Scoville | B66B 1/468 |
| 2021/0276826 | A1* | 9/2021 | Geer | B66B 1/468 |

FOREIGN PATENT DOCUMENTS

| | | | | | |
|---|---|---|---|---|---|
| CN | 109019197 | A | * | 12/2018 | B66B 1/3461 |
| CN | 109279461 | A | * | 1/2019 | B66B 1/3461 |
| CN | 109969888 | A | * | 7/2019 | B66B 1/3461 |
| CN | 110304500 | A | | 10/2019 | |
| CN | 110606413 | A | | 12/2019 | |
| EP | 3381851 | A2 | * | 10/2018 | B66B 3/02 |
| EP | 3412612 | A1 | | 12/2018 | |
| EP | 3536645 | A1 | | 9/2019 | |
| EP | 3566991 | A1 | * | 11/2019 | B66B 1/06 |
| EP | 3715296 | A1 | * | 9/2020 | B66B 1/06 |
| EP | 3418236 | B1 | * | 3/2024 | B66B 1/3461 |
| FR | 2785597 | A1 | * | 5/2000 | B66B 1/468 |
| KR | 100717929 | B1 | * | 5/2007 | B66B 1/22 |
| KR | 20090027663 | A | * | 3/2009 | B66B 1/18 |
| KR | 101564821 | B1 | * | 10/2015 | B66B 1/34 |
| KR | 20190134479 | A | * | 12/2019 | B66B 5/0043 |
| WO | 2015070926 | A1 | | 5/2015 | |
| WO | 2017112659 | A1 | | 6/2017 | |
| WO | WO-2020022332 | A1 | * | 1/2020 | B66B 13/14 |

OTHER PUBLICATIONS

Chinese Office Action for Application No. 202011393537.0; Issue Jan. 13, 2023; 9 Pages.

* cited by examiner

RECEIVER-LESS DEVICE POSITIONING

BACKGROUND

The subject matter disclosed herein generally relates to elevator service requests for elevators and, more particularly, to performing receiverless position approximation for elevator service requests.

In today's environment, elevator systems can recognize the existence of individual users planning to use the elevator in order to respond to demand or requests for service. Control panels, including but not limited to buttons, keypad devices, and touchscreen devices may be used for entering a request for elevator service. For example, an elevator system may utilize a two-button control panel configuration (e.g., up and down buttons), wherein a direction of travel within the elevator system is requested by pressing one of the two buttons. An elevator system may utilize a keypad and/or touchscreen device with destination dispatching, such that a user may specify a floor or landing that the user would like to be taken to as part of the request for service. In either case/configuration, a user/passenger engages in an affirmative action to request elevator service by using devices available at an elevator landing, i.e., where the elevator is called and entered/exited by passengers.

Currently, remote elevator requests are supported by some elevators systems. As such, occasionally unintended elevator call requests are placed by a user device that is remote from the requested elevator system. This can lead to a delay for users waiting for elevator service due to the unintended requests.

BRIEF SUMMARY

According to an embodiment, a method for operating a receiverless device positioning, the method includes receiving, by a processor, a first request corresponding to a first location; registering data associated with the first request; receiving a second request at a second location, the first location is different than the second location; comparing the first and second location, and time between the first request and the second request; and allowing the second request based at least in part on the comparison.

In addition to one or more of the features described herein, or as an alternative, further embodiments include a first request that is a first elevator call request to a first elevator system at the first location and a second request that is a second elevator call request to a second elevator system at the second location.

In addition to one or more of the features described herein, or as an alternative, further embodiments include a registered data associated with the first request includes location information of the first location and the second location, and time information for the first request and the second request.

In addition to one or more of the features described herein, or as an alternative, further embodiments include responsive to allowing the second request, updating the location information of the registered data from the first location to the second location.

In addition to one or more of the features described herein, or as an alternative, further embodiments include determining the location information without the assistance of GPS data, Bluetooth beacon, or positioning data of a user device.

In addition to one or more of the features described herein, or as an alternative, further embodiments include a first request that is transmitted from a location remote from the first location.

In addition to one or more of the features described herein, or as an alternative, further embodiments include comparing the first location and the second location which includes comparing a distance between the first location and the second location to a threshold distance.

In addition to one or more of the features described herein, or as an alternative, further embodiments include using a threshold distance that is a dynamic radius based on estimated travel time between the first location and the second location.

In addition to one or more of the features described herein, or as an alternative, further embodiments include comparing the time between the first request and the second request to a threshold time period.

In addition to one or more of the features described herein, or as an alternative, further embodiments include denying subsequent requests if the subsequent requests are transmitted within an inactivity period.

According to another embodiment, a system configured to perform receiverless positioning. The system includes a user device; a memory; a processor coupled to the memory, the processor configured to: receive a first request corresponding to a first location; register data associated with the first request; receive a second request at a second location, the first location is different than the second location; compare the first location and second location, and time between the first request and the second request; and allow the second request based at least in part on the comparison.

In addition to one or more of the features described herein, or as an alternative, further embodiments include a first elevator system at a first location; and a second elevator system at a second location, wherein the first elevator system is different than the second elevator system.

In addition to one or more of the features described herein, or as an alternative, further embodiments include a memory that is configured to store the registered data associated with the first request comprising location information of the first location and the second location, and time information for the first request and the second request.

In addition to one or more of the features described herein, or as an alternative, further embodiments include a processor that is configured to update the location information of the registered data from the first location to the second location responsive to allowing the second request.

In addition to one or more of the features described herein, or as an alternative, further embodiments include determining location information without the assistance of GPS data, Bluetooth beacon, or other positioning data from of the user device.

In addition to one or more of the features described herein, or as an alternative, further embodiments include a first request that is transmitted from a location remote from the first location.

In addition to one or more of the features described herein, or as an alternative, further embodiments include comparing the first location and the second location comprises comparing a distance between the first location and the second location to a threshold distance.

In addition to one or more of the features described herein, or as an alternative, further embodiments include a memory that is configured to store the threshold distance, wherein the threshold distance is a dynamic radius based on estimated travel time between the first location and the second location.

In addition to one or more of the features described herein, or as an alternative, further embodiments include a processor that is configured to compare the time between the first request and the second request to a threshold time period.

In addition to one or more of the features described herein, or as an alternative, further embodiments include a processor that is configured to deny subsequent requests if the subsequent requests are transmitted within an inactivity period.

The technical effects of embodiments of the present disclosure include enabling remote elevator requests that are not based on the GPS data. In addition, technical effects and benefits include improved nuisance elevator request filtering. Also, the receiverless device positioning can be applied to other systems such as enabling/disabling digital payments at physical stores to prevent fraudulent use.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
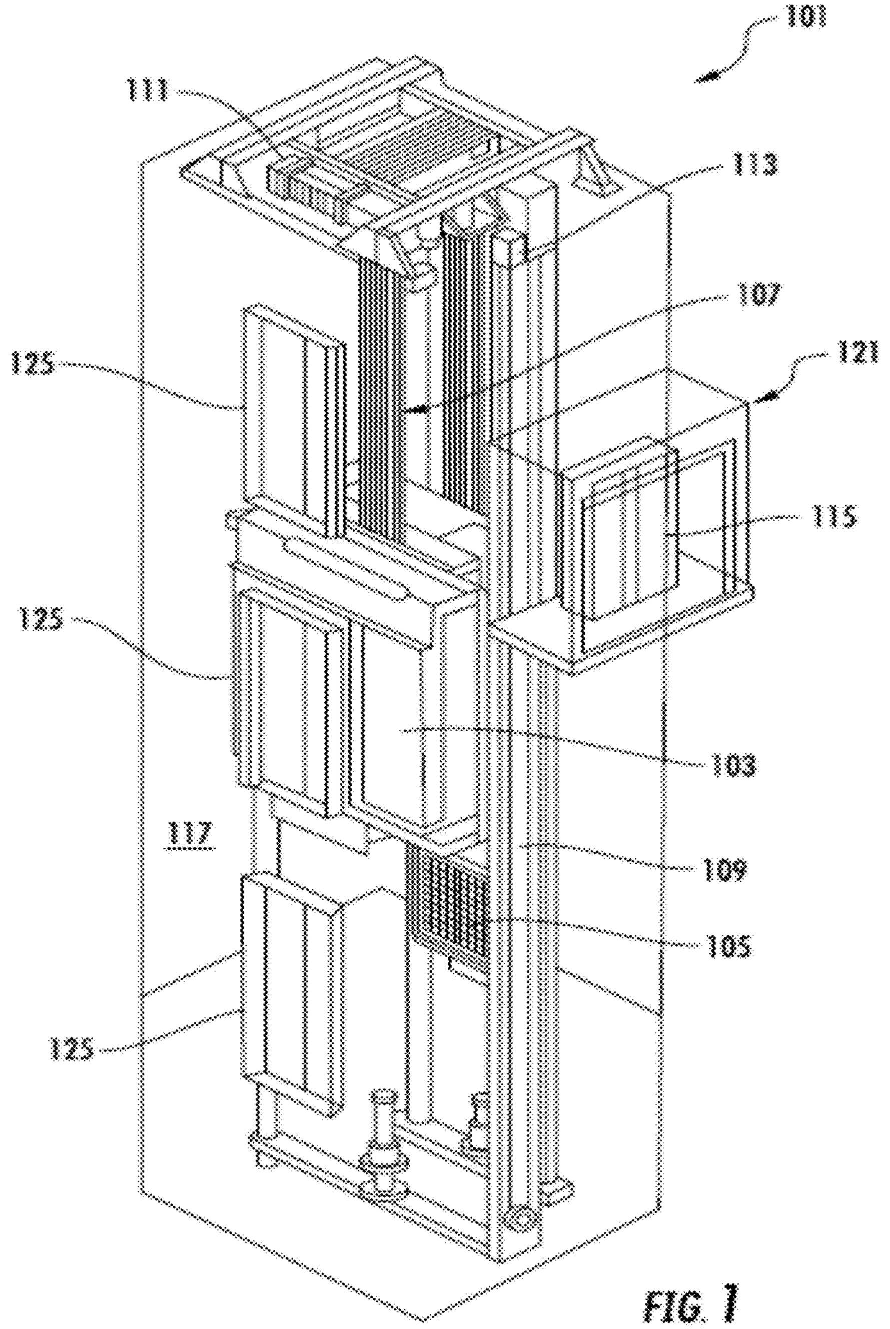
FIG. 1 is a schematic illustration of an elevator system that may employ various embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element “a” that is shown in FIG. X may be labeled “Xa” and a similar feature in FIG. Z may be labeled “Za.” Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Embodiments provided herein are directed to methods and systems for performing a receiverless positioning technique for processing requests, such as a request for elevator service. In some embodiments, a request for elevator service may be communicated over one or more lines, connections, or networks, such as one or more cellular networks, e.g. a request made by a user device such as a smart phone. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the mobile device.

In elevator systems that allow for remote elevator requests, issues may arise with nuisance calls where a user unintentionally places an elevator call request. Some conventional techniques use GPS data associated with a user device to place an elevator call to assist in managing nuisance calls. Other conventional systems may implement Bluetooth beacons to obtain positioning information for a user device. However, these techniques may be unreliable and can have high power consumption or energy costs. The techniques described herein provide a receiverless positioning method that does not rely on GPS data, Bluetooth beacons, or other positioning type data to process service requests for an elevator system.

Figure 2:
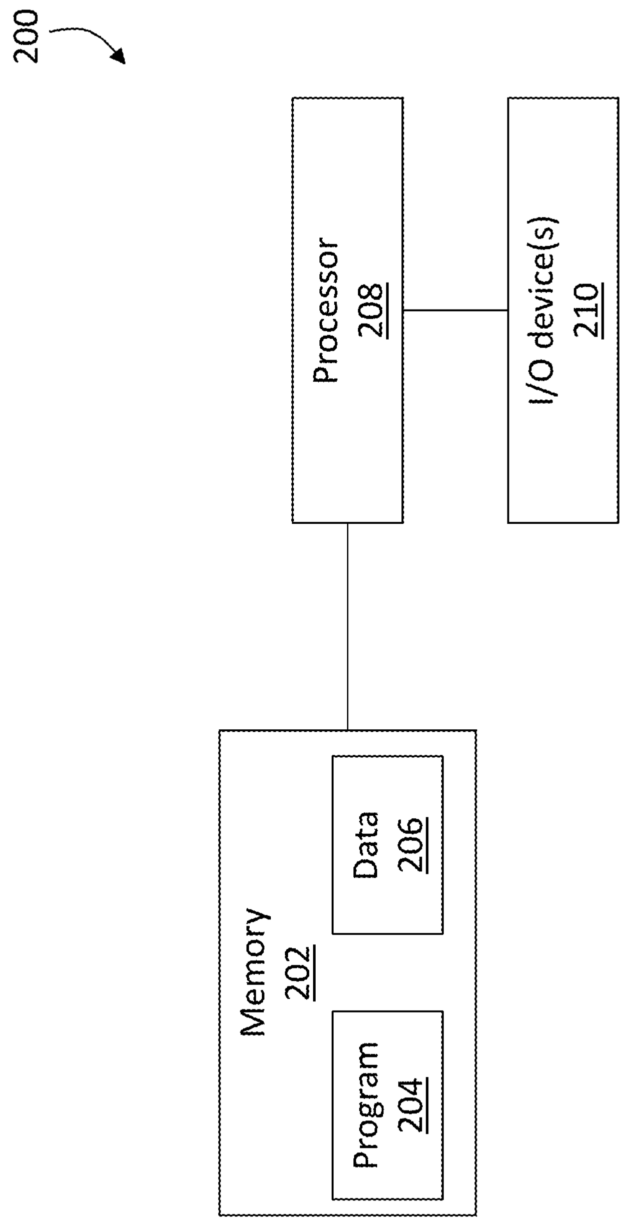
FIG. 2 depicts an example processing system in accordance with one or more embodiments of the disclosure.

Referring now to FIG. 2, an example computing system 200 is shown. The computing system 200 may be configured as part of and/or in communication with an elevator controller, e.g., controller 115 shown in FIG. 1. The system includes a memory 202 which may store executable instructions and/or data. The executable instructions may be stored or organized in any manner and at any level of abstraction, such as in connection with one or more applications, processes, routines, procedures, methods, etc. As an example, at least a portion of the instructions are shown in FIG. 2 as being associated with a program 204.

Further, as noted, the memory 202 may store data 206. The data 206 may include profile or registration data, elevator car data, a device identifier, or any other type(s) of data. The instructions stored in the memory 202 may be executed by one or more processors, such as a processor 208. The processor 208 may be operative on the data 206.

The processor 208 may be coupled to one or more input/output (I/O) devices 210. In some embodiments, the I/O device(s) 210 may include one or more of a keyboard or keypad, a touchscreen or touch panel, a display screen, a microphone, a speaker, a mouse, a button, a remote control, a joystick, a printer, a telephone or mobile device (e.g., a smartphone), a sensor, etc. The I/O device(s) 210 may be configured to provide an interface to allow a user to interact with the computing system 200. For example, the I/O device(s) may support a graphical user interface (GUI) and/or voice-to-text capabilities.

The components of the computing system 200 may be operably and/or communicably connected by one or more buses. The computing system 200 may further include other features or components as known in the art. For example, the computing system 200 may include one or more transceivers and/or devices configured to receive information or data from sources external to the computing system 200. For example, in some embodiments, the computing system 200 may be configured to receive information over a network (wired or wireless). The information received over a network may be stored in the memory 202 (e.g. as data 206) and/or may be processed and/or employed by one or more programs or applications (e.g., program 204).

The computing system 200 may be used to execute or perform embodiments and/or processes described herein. For example, the computing system 200, when configured as part of an elevator control system, may be used to receive commands and/or instructions, and may further be configured to control operation of and/or reservation of elevator cars within one or more elevator shafts.

Figure 3:
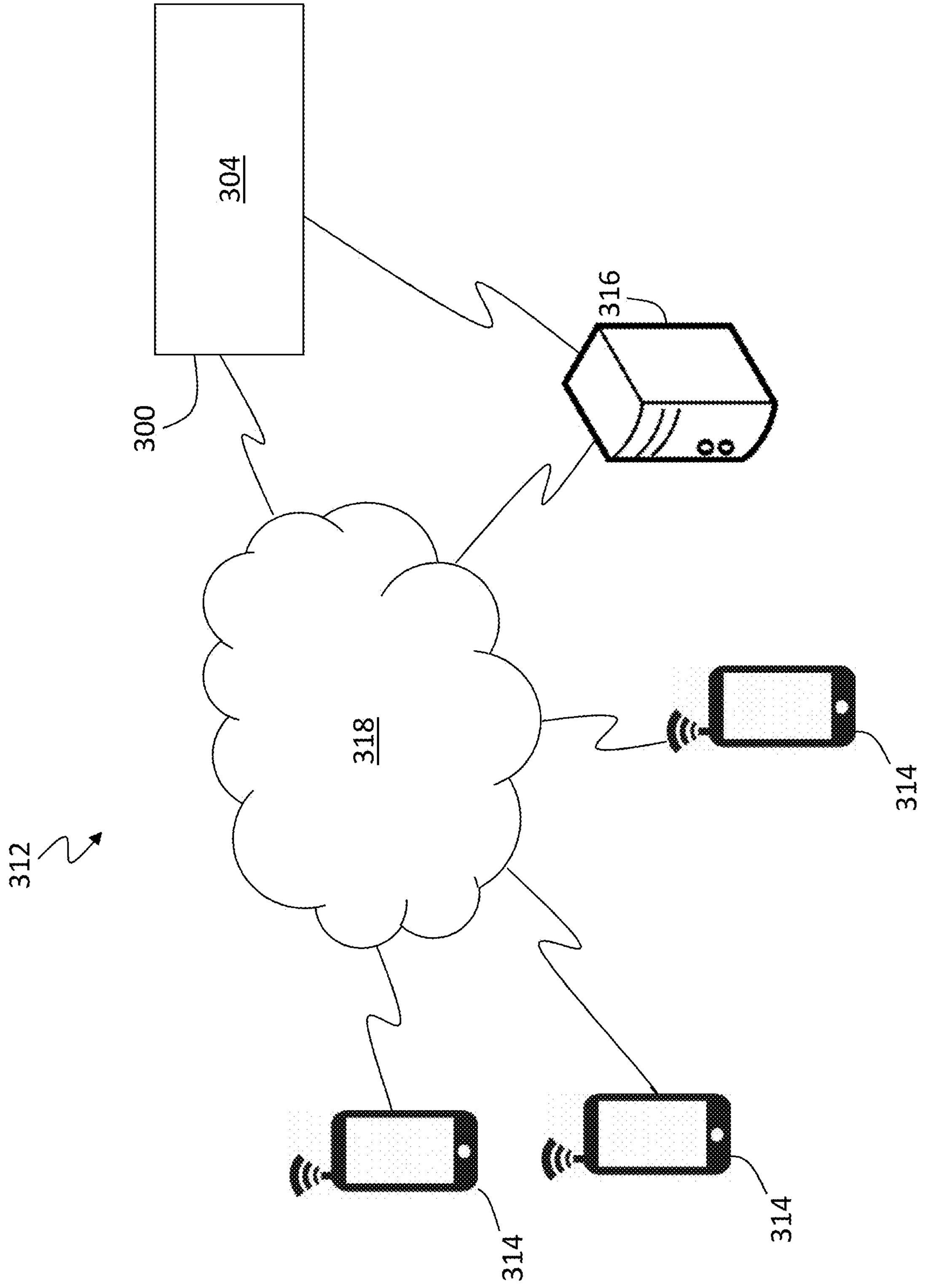
FIG. 3 depicts a system for performing the receiverless device position approximation in accordance with one or more embodiments of the disclosure.

Referring to FIG. 3, a block diagram of an elevator control system 312 for enabling control of an elevator system pertaining to a discussion in accordance with an embodiment is shown. The system 312 includes an elevator reservation and control program or application for performing the processing described herein that is executed by one or more computer programs located on a computing system 300 and/or one or more user systems 314, 316. The computing system 300 of FIG. 3 may be configured as a computing system similar to computing system 200 shown in FIG. 2.

The elevator control system 312 depicted in FIG. 3 includes one or more user systems 314, 316 through which users, e.g., users and passengers of an elevator system, communicate with the elevator control system 312. The user systems 314, 316 are coupled to the computing system 300 via a network 318. Each user system 314 may be implemented using a general-purpose computer executing a computer program for carrying out the processes described herein. The user systems 314, 316 may be user devices such as personal computers (e.g., a laptop, a tablet computer, a cellular telephone, etc.) or host attached terminals. If the user systems 314, 316 are personal computers, in some embodiments, the processing described herein may be shared by a user system 314, 316 and the host system 300. The user systems 314, 316 may also include game consoles, smartphones, tablets, wearable electronic devices, network management devices, and field-programmable gate arrays.

The network 318 may be any type of known network including, but not limited to, a wide area network (WAN), a local area network (LAN), a global network (e.g. Internet), a virtual private network (VPN), a cloud network, and an intranet. The network 318 may be implemented using a wireless network or any kind of physical network implementation known in the art. A user system 314, 316 may be coupled to the computing system 300 through multiple networks 318 (e.g., cellular and Internet) so that not all user systems 314, 316 are coupled to the computing system 300 through the same network 318. One or more of the user systems 314 and the computing system 300 may be connected to the network 318 in a wireless fashion. In one non-limiting embodiment, the network is the Internet and one or more user systems 314 execute a user interface application (e.g. a web browser) to contact the computing system 300 through the network 318. In another non-limiting example embodiment, a user system 316 may be connected directly (i.e., not through the network 318) to the computing system 300.

As noted, the computing system 300 may be associated with an elevator system (e.g., elevator system 101 and in communication with or part of controller 115 of FIG. 1). The computing system 300 may be used to process or fulfill requests for elevator service.

The requests for elevator service may be received through the network 318 from one or more user systems 314, 316, which may be mobile devices, including, but not limited to phones, laptops, tablets, smartwatches, etc. One or more of the user systems 314 may be associated with (e.g., owned by) a particular user. The user may use his/her user device(s) 314, 316 to request a service, such as an elevator service.

For example, a user of a user system 314 may request service in an affirmative or active manner. For example, the user may enter an explicit request for elevator service using an I/O interface of the user system 314. That is, in some embodiments, an app or other program may be installed and operated on a user system 314 wherein the user may interact with the application or other program to request elevator service.

In other embodiments, or in combination therewith, the user may request elevator service in a passive manner. For example, a profile may be established for the user or the particular user system 314, 316, optionally as part of a registration process with, e.g., a service provider. The profile may contain a log of the user's history and/or activities, such as where the user has gone or traveled to, the user's preferences, or any other data that may be applicable to the user. The profile may be accessed or analyzed to determine the likelihood or probability that the user will request elevator service at a particular moment in time (e.g., a particular day or time of day).

The request for service may be conveyed or transmitted from the user system 314, 316 through the network 318. For example, the request for service may be transmitted to and/or over the Internet and/or a cellular network. The network(s) may include infrastructure that may be organized to facilitate cloud computing. For example, one or more servers, such as a primary message server, a backup message server, and a device commissioning message server may be employed as part of the network 318.

In some embodiments, the request for service may specify a type of service requested, at any level of detail or abstraction. For example, a first request for service may specify that elevator service is requested, a second request for service may specify one or more of a departure floor and/or a destination floor, and a third request for service may specify that elevator service is desired to accommodate a heavy load (e.g., freight or cargo) with a number of other users or passengers in an amount less than a threshold. In some embodiments, the request for service transmitted from the user system 314, 316 may include an identifier associated with the user or the particular user system 314, 316 in order to allow, e.g., the computing system 300 to distinguish between users and/or user systems 314, 316.

The computing system 300 (and program 304 stored thereon) may be configured to process requests for service received from one or more mobile systems 314, 316. As part of the processing, the computing system 300 may validate or authenticate a user system 314, 316 and/or a user, potentially based on an identifier associated with the user and/or the user system 314, 316. The validation may be based on or include a location of the user and/or the user system 314, 316. In one or more embodiments, the location may be determined based on the initial request for service without the assistance of one or more location-based services or techniques, such as triangulation, global positioning system (GPS), network connection, Wi-Fi connection, etc. In one or more embodiments of the disclosure, the location of the initial elevator request is assumed to be the location of the elevator receiving the request.

If a service request is validated or approved by, e.g., the computing system 300, the service request may be transmitted from the computing system 300 to one or more controllers, such as one or more elevator controllers (e.g., controller 115). The controllers may be configured to communicate with the computing system 300 and/or one another to fulfill service requests. In this respect, it should be noted that service requests might not only originate from user system 314, 316 but may also originate locally (e.g., within a building in which the controllers may be located or in which the requested service(s) may be provided). The controllers may select a resource (e.g., an elevator system or elevator car) that is suited to fulfill a service request, potentially based on one or more considerations, such as power consumption/efficiency, quality of service (e.g., reduction in waiting time until a user or passenger arrives at a destination floor or landing), etc. In some embodiments, the computing system 300 may select the resource to fulfill a service request, and such a selection may be transmitted by the computing system 300 to one or more of the controllers.

In some embodiments, one or more of the controllers and/or the computing system 300 may be registered with a service provider. The service provider may be responsible for accepting and processing (e.g., validating or approving/disapproving) service requests and routing (approved) service requests to an appropriate entity (e.g., one or more elevator controllers).

Figure 4:
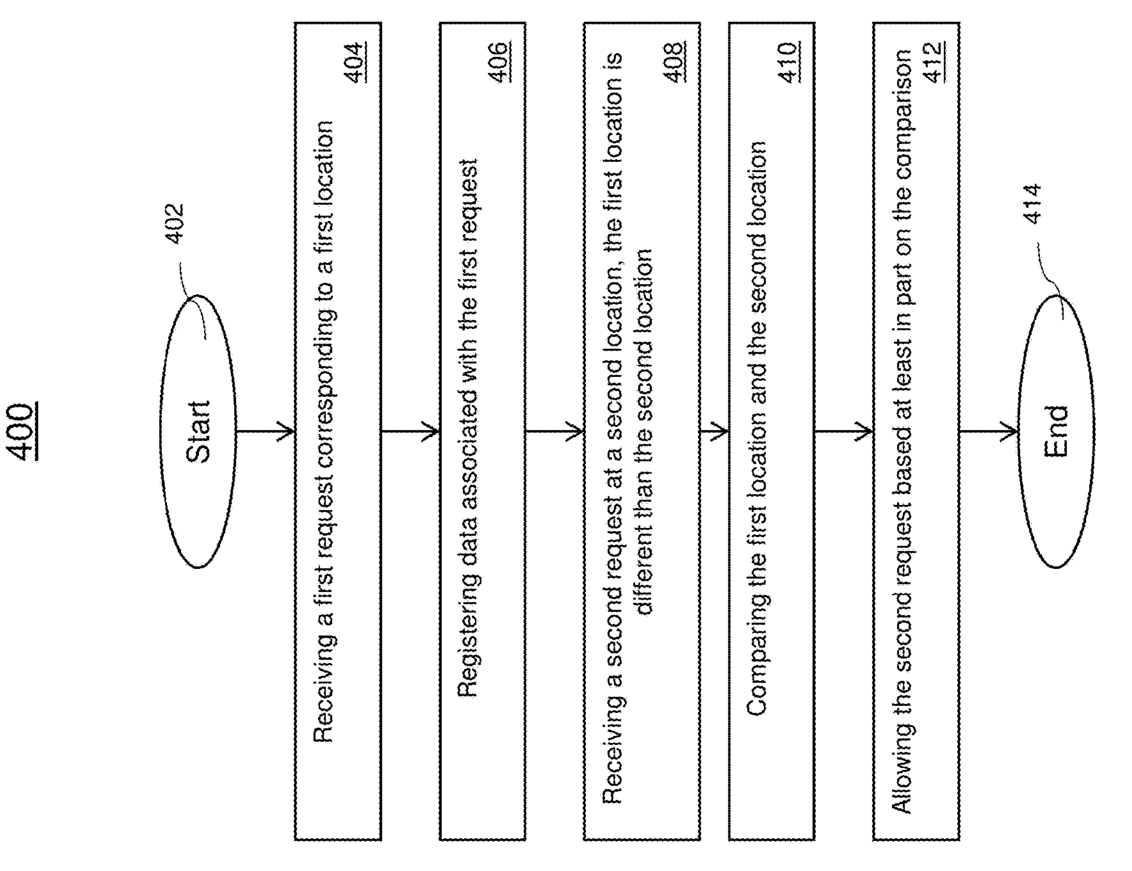
FIG. 4 depicts a method for performing the receiverless device position approximation in accordance with one or more embodiments of the disclosure.

FIG. 4 depicts a method 400 for performing a receiverless device position approximation in accordance with one or more embodiments. The method 400 begins at block 402 and proceeds to block 404 which provides for receiving, by a processor, a first request corresponding to a first location. In a non-limiting example, the first request can include an elevator call request for an elevator in a first location. The request can be placed locally at the elevator system or remotely transmitted to the elevator system from a user device. Block 406 registers data associated with the first request. In one or more embodiments of the disclosure, the registered data includes location information, a timestamp for the request, and other information. The location for the first request is determined without the assistance of the GPS data of a user device, Bluetooth beacon information, IP data, cellular triangulation data, etc. The initial location is determined based on the location where the request is placed, for example, the initial location is assumed to be the location of the elevator where the request is placed. Also, the initial request is considered to be a valid request. In one or more embodiments of the disclosure, the user location is collocated with the first elevator request. That is, the location of the user is initialized to the location of the elevator where the first elevator request is received. Therefore, the system can assume the user is at the location of the first request without the assistance of the GPS data, Bluetooth beacons, IP addresses, positioning data, etc.

Block 408 receives a second request at a second location, the first location is different than the second location. A second request is an elevator call request for a second location that is a distance away from the first location. In a non-limiting example, the first elevator system is in a first building and the second elevator system is a second building that is a distance away from the first building. The second request is remotely placed using the user device. For example, a user that is not at the location of the second elevator system or may be in route to the second elevator system, can place an elevator request using a user device for the second elevator system. Block 410 compares the first location and the second location. The distance between the first building and the second building can be determined by a number of known techniques by using the coordinates of the first and second building. In a non-limiting example, mapping software can be used to calculate the travel distance and estimated travel time between the first building and the second building. Also, timing information can be compared between the time the first request and the second request are placed. The timing information can assist in determining whether the user can reach the location of the second request based on the elapsed time between the first request and the second request. For example, if 5 minutes have passed between the requests and the second building is located a 7 minute walk away, this may be deemed a reasonable requests. However, if the second building is a 4 hour walk away, the request may be deemed an unreasonable request.

Block 412 allows the second request based at least in part on the comparison. In one or more embodiments, the second request is either allowed to be requested to the second elevator system or denied based on one or more factors. If the distance between the first building and the second building exceeds a distance threshold, the second request is not placed. The distance can be a threshold radius. In one or more embodiments of the disclosure, the distance threshold can be a configurable threshold, or the distance threshold can be determined based on the walking speed or speed limits traveled by a vehicle. In some embodiments, the traffic information or modes of transportation can be used to estimate the travel time between the buildings. In addition, the time between placing the first call and the second call can be used. On the other hand, if the second building is within a distance threshold, the second request is transmitted to the elevator system. It may be unreasonable to assume the user can reach the second location. For example, if a user places a subsequent request to an elevator in a building that is 100 miles away, the request may be determined to be unreasonable based on the distance and estimated travel time. Therefore, the second calls may be ignored in such an event and the elevator call is not dispatched. In some embodiments an inactivity period can be used to prevent nuisance calls. If the inactivity period has expired between the time the first request was placed and the second request was placed, the second request is allowed. In a non-limiting example, the inactivity period can be in the range of 5-10 minutes in duration and any calls that are placed after the expiration of the inactivity period can be allowed. It should be understood that the inactivity period can be increased or decreased based on the application. Otherwise, the second request is denied.

In one or more embodiments of the disclosure, upon allowing the second request, the location information associated with the user is updated to the second location where the second request was placed. The second location is also determined without using the location or positioning data previously described. For example, if an elevator of a second building is requested, the second location is set to the location of the second building receiving the request. The updated location is now used for placing any subsequent requests and the method 400 is repeated to determine whether the request should be allowed or denied.

In one or more embodiments of the disclosure, the interactive distance threshold or threshold radius is configurable and can be increased or decreased based on the application. In one or more embodiments of the disclosure, the threshold radius can be increased as a function of time from the initial request. For example, the threshold radius may be increased by an average distance a person can walk over a period of time. In another example, the threshold radius can be a dynamic or variable threshold and may be increased by a default value such as a number of feet per second or some other value. The method 400 ends at block 414.

In a different application, the techniques described herein can be applied to credit card transactions. For example, if a credit card is used at a first location and subsequently used in another location outside of a distance radius or timeout period from the first use, the second transaction can be declined. This scenario may indicate a fraudulent use and provide protections to credit card users.

Figure 5:
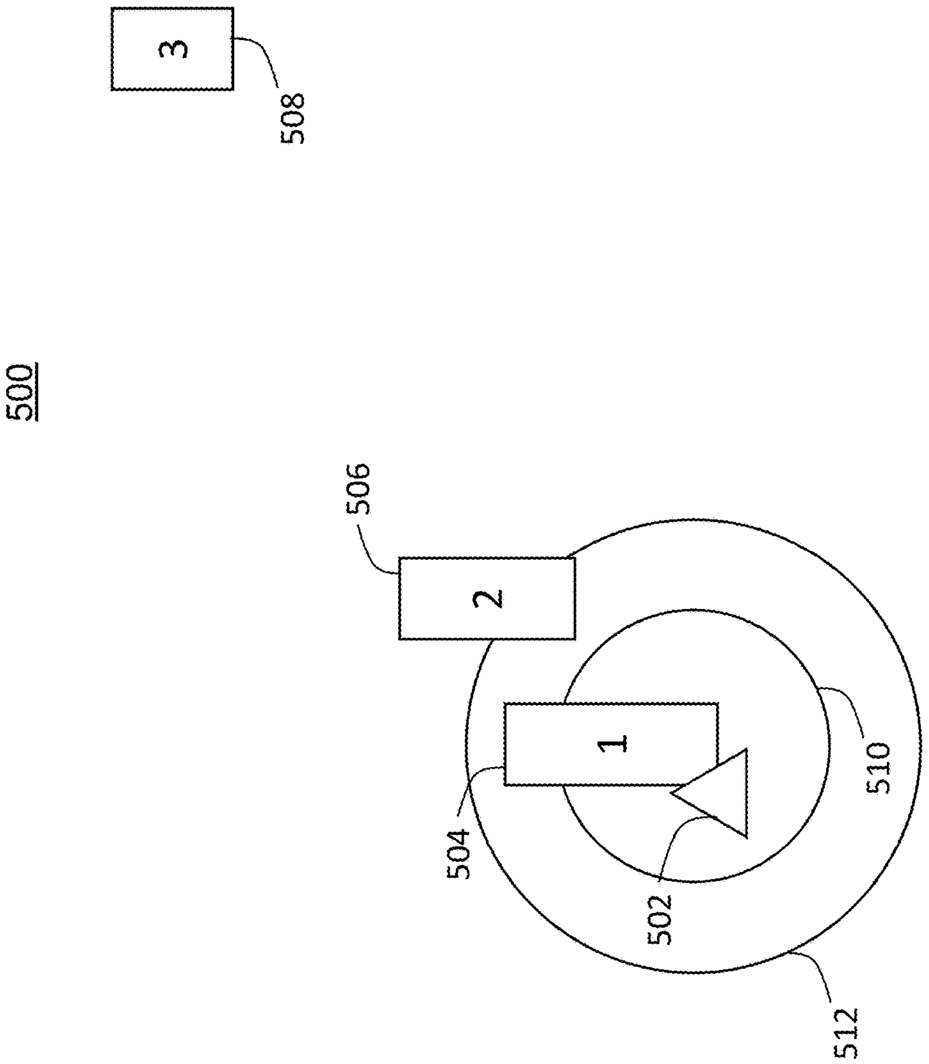
FIG. 5 illustrates example scenarios for performing the receiverless position approximation method in accordance with one or more embodiments of the disclosure.

FIG. 5 illustrates non-limiting examples for the system 500 in accordance with one or more embodiments of the disclosure. In a first scenario, a user places an elevator request to a first building 504 using a user device 502. The user's location is initialized to be the location at the first building 504 and a request radius 510 is established. Next, the user takes a 5 minute walk to a second building 506 where a second elevator request is placed. The system accepts the second request to the second building 506 because the accepted elevator request radius increased over the elapsed time to include the second building 506 as shown by the radius 512.

In another scenario, a user places an elevator request to the first building 504 and immediately tries to place a second elevator request in the second building 506. The request placed to the second building 506 is denied because the second building 506 is located at a 5 minute walk away, and would not be within the accepted elevator request radius 510 at the time of the second elevator request.

In a different scenario, a user places a first elevator request to the first building 504 and does not place another elevator request for an extended period of time (such as 60 minutes). Subsequently, the user places a second elevator request for a different building 508 located 12 miles away (approximately 4 hours walking). The second elevator request is accepted because the inactive period has elapsed, and the device location is updated to the other building 508.

In one or more embodiments, the first location is determined without the assistance of any location information such as a GPS system or indoor positioning system. The first request for a particular elevator is used as a proxy for the first location. The technical effects and benefits include reducing the number of nuisance calls or potentially fraudulent requests for a transaction.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for operating a receiverless device positioning, the method, executed by a processor, comprising:
- receiving, by the processor, a first request corresponding to a first location of a user;
- registering data associated with the first request;
- receiving a second request at a second location from the same user, the first location is different than the second location;
- comparing the first and second location, and time between the first request and the second request; and
- allowing the second request based at least in part on the comparison.

2. The method of claim 1, wherein the first request is a first elevator call request to a first elevator system at the first location and the second request is a second elevator call request to a second elevator system at the second location.

3. The method of claim 1, wherein the registered data associated with the first request comprises location information of the first location and the second location, and time information for the first request and the second request.

4. The method of claim 3, further comprising responsive to allowing the second request, updating the location information of the registered data from the first location to the second location.

5. The method of claim 3, wherein the location information is determined without the assistance of GPS data, Bluetooth beacon, or positioning data of a user device.

6. The method of claim 1, wherein the first request is transmitted from a location remote from the first location.

7. The method of claim 1, wherein comparing the first location and the second location comprises comparing a distance between the first location and the second location to a threshold distance.

8. The method of claim 7, wherein the threshold distance is a dynamic radius based on estimated travel time between the first location and the second location.

9. The method of claim 1, further comprising comparing the time between the first request and the second request to a threshold time period.

10. The method of claim 1, further comprising denying subsequent requests if the subsequent requests are transmitted within an inactivity period.

11. A system configured to perform receiverless positioning, the system comprising:
- a user device;
- a memory;
- a processor coupled to the memory, the processor configured to:
  - receive a first request corresponding to a first location of a user;
  - register data associated with the first request;
  - receive a second request at a second location from the same user, the first location is different than the second location;
  - compare the first location and second location, and time between the first request and the second request; and
  - allow the second request based at least in part on the comparison.

12. The system of claim 11, further comprising:
- a first elevator system at a first location; and
- a second elevator system at a second location, wherein the first elevator system is different than the second elevator system.

13. The system of claim 11, wherein the memory is configured to store the registered data associated with the first request comprising location information of the first location and the second location, and time information for the first request and the second request.

14. The system of claim 13, wherein the processor is configured to update the location information of the registered data from the first location to the second location responsive to allowing the second request.

15. The system of claim 13, wherein the location information is determined without the assistance of GPS data, Bluetooth beacon, or other positioning data from of the user device.

16. The system of claim 11, wherein the first request is transmitted from a location remote from the first location.

17. The system of claim 11, wherein comparing the first location and the second location comprises comparing a distance between the first location and the second location to a threshold distance.

18. The system of claim 17, wherein the memory is configured to store the threshold distance, wherein the threshold distance is a dynamic radius based on estimated travel time between the first location and the second location.

19. The system of claim 11, wherein the processor is configured to compare the time between the first request and the second request to a threshold time period.

20. The system of claim 11, wherein the processor is configured to deny subsequent requests if the subsequent requests are transmitted within an inactivity period.

* * * * *